United States Patent
Inda

(10) Patent No.: US 8,221,916 B2
(45) Date of Patent: Jul. 17, 2012

(54) METHOD FOR MANUFACTURING LITHIUM ION SECONDARY BATTERY

(75) Inventor: Yasushi Inda, Kanagawa (JP)

(73) Assignee: Ohara Inc., Sagamihara-shi (JP)

( * ) Notice: Subject to any disclaimer, the term of this patent is extended or adjusted under 35 U.S.C. 154(b) by 613 days.

(21) Appl. No.: 12/364,407

(22) Filed: Feb. 2, 2009

(65) Prior Publication Data

US 2009/0197172 A1    Aug. 6, 2009

(30) Foreign Application Priority Data

Jan. 31, 2008  (JP) .................................. 2008-022167

(51) Int. Cl.
*H01M 10/16* (2006.01)
*H01M 4/02* (2006.01)
*H01M 4/82* (2006.01)

(52) U.S. Cl. .................. 429/208; 429/209; 29/623.1

(58) Field of Classification Search ............... None
See application file for complete search history.

(56) References Cited

U.S. PATENT DOCUMENTS

| | | |
|---|---|---|
| 6,344,426 B1 | 2/2002 | Hata et al. |
| 6,387,480 B1* | 5/2002 | Komada et al. ............ 428/316.6 |
| 7,108,827 B1* | 9/2006 | Hata et al. ..................... 264/608 |
| 7,687,173 B2* | 3/2010 | Cubukcu et al. .............. 429/434 |
| 2006/0113034 A1* | 6/2006 | Seabaugh et al. .......... 156/308.2 |
| 2007/0253271 A1* | 11/2007 | Ito et al. ........................ 365/222 |

FOREIGN PATENT DOCUMENTS

| | | |
|---|---|---|
| JP | 04-37646 A | 2/1992 |
| JP | 06-009268 A | 1/1994 |
| JP | 2001-114577 A | 4/2001 |
| JP | 2006-160590 A | 6/2006 |
| JP | 2007-001860 A | 1/2007 |
| WO | 99/55639 A1 | 11/1999 |
| WO | 99/59936 A1 | 11/1999 |

* cited by examiner

*Primary Examiner* — Melvin C Mayes
*Assistant Examiner* — Sheng H Davis
(74) *Attorney, Agent, or Firm* — Westermann, Hattori, Daniels & Adrian, LLP

(57) ABSTRACT

A method for manufacturing a lithium ion secondary battery comprises the step of sintering a laminate sandwiched by setters disposed on both sides of the laminate having only interfaces between an electrolyte green sheet and a positive electrode green sheet and/or a negative electrode green sheet. A lithium ion secondary battery manufactured by the method described above is also provided.

12 Claims, 1 Drawing Sheet

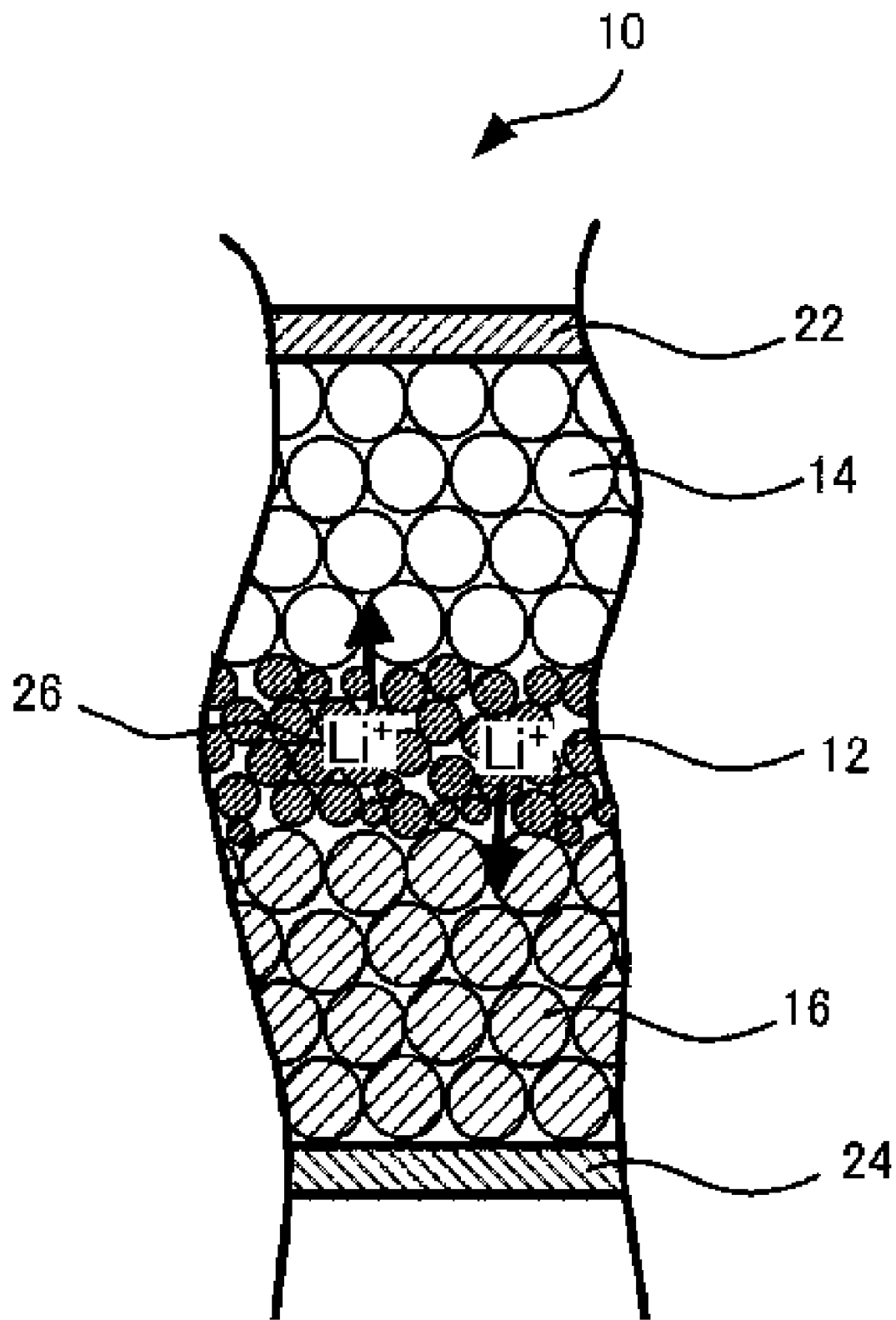

METHOD FOR MANUFACTURING LITHIUM ION SECONDARY BATTERY

CROSS REFERENCE TO RELATED APPLICATIONS

This application is based upon and claims the benefits of priorities from Japanese patent application number 2008-022167 filed on Jan. 31, 2008, the entire contents of which are incorporated herein by reference.

FIELD OF THE INVENTION

The present invention relates to a method for manufacturing a lithium ion secondary battery, more specifically, it relates to a method of manufacturing a laminate, which is constituted of a positive electrode green sheet, an electrolyte green sheet, and a negative electrode green sheet. It also relates to the lithium ion secondary battery manufactured by this method.

BACKGROUND ART

As electronic devices are miniaturized more and more, demand for lithium ion secondary batteries having a high voltage and a high energy density is increasing. However, it is also demanded more and more to reduce the cost of the lithium ion secondary batteries as they are now widely used. While heat generation during charging and discharging is of concern when an organic electrolyte is used, bonding states of a positive electrode and a negative electrode by sintering are important when a solid electrolyte is used. Sintering conditions (for example, temperature, atmosphere, etc.) for achieving a good bonding state are not necessarily the same for sintering the positive electrode as those for sintering the negative electrode such that some kind of tuning the conditions is preferably implemented.

For example, Japanese patent application publication No. H04-037646 discloses an art of enclosing a zirconia-based conductive ceramic film with a ceramic during a sintering process so as not to emit heat from the heater directly to the film. Also, Japanese patent application publication No. H06-009268 discloses an art of sintering a zirconia green sheet while applying a load using a weight. And Japanese patent application publication No. 2001-114577 discloses a porous ceramic thin plate to be utilized as a setter or a spacer, etc., in sintering a ceramic green sheet of a solid electrolyte material has. Furthermore, International publication WO99/055639 closes a solid electrolyte ceramic sheet manufactured by sintering a green sheet to be sintered in a state that it is sandwiched between spacers. Yet furthermore, International publication WO99/059936 discloses setters of ceramic body in a sheet form and a ceramic sheet for a solid electrolyte fuel cell which is sintered in a state that it is sandwiched by the setters on both sides thereof. Japanese patent application publication No. 2007-001860 discloses a porous ceramic thin plate to be utilized as a setter used in sintering a ceramic green sheet to be formed into a solid electrolyte material or as a spacer or the like for sintering a sheet disposed on and/or overlaid with the spacer.

However, the above conventional art merely discloses inventions which can prevent direct reaction with an original plate material by placing the green sheet to be sintered on the setter and prevent components in the green sheet from being decomposed and released from an upper surface of the green sheet by placing the setter on the upper surface such that the conventional inventions merely provide the way to confine the green sheet by enclosing it with a lid.

Here, in the case of a lithium ion battery produced through a sintering process, for example, it is generally preferable to fire an electrode material on a positive electrode side in a reducing atmosphere and to fire an electrode material on a negative electrode side in air or an oxidizing atmosphere when the electrode materials are metal oxide. Also, for example in a case where electrode materials on the positive electrode side and the negative electrode side differ significantly in the melting point, the positive electrode and the negative electrode are preferably sintered separately. Since a positive electrode green sheet and a negative electrode green sheet are thus sintered individually and these are bound to a separately-sintered electrolyte green sheet, all green sheets cannot be sintered integrally and the productivity is poor.

Further features of the present invention, its nature, and various advantages will be more apparent from the accompanying drawings and the following description of the preferred embodiment.

BRIEF DESCRIPTION OF THE DRAWINGS

FIG. 1 is a section view of a lithium ion secondary battery according to an embodiment of the present invention.

DESCRIPTION OF THE PREFERRED EMBODIMENT

Although an embodiment of the present invention will be described in detail with reference to the drawings, the following description is provided to describe the embodiment of the present invention, and the present invention is not limited to the following embodiment. And the same or related symbols are used to refer to the same or same kind of element and redundant description is omitted.

FIG. 1 shows a section view of a lithium ion secondary battery 10 according to an embodiment of the present invention. The lithium ion secondary battery 10 is configured such that a positive electrode 14 formed by sintering a positive electrode green sheet and a negative electrode 16 formed by sintering a negative electrode green sheet are disposed on a top face and a bottom face of an electrolyte 12 formed by sintering an electrolyte green sheet, respectively, and that the laminate of the positive electrode 14, the electrolyte 12, and the negative electrode 16 is in turn disposed between a positive electrode current collector 22 and a negative electrode current collector 24. The battery operates as lithium ions 26 inside the electrolyte 12 move to and from the positive and negative electrodes 14, 16 as indicated by arrows in FIG. 1.

[Lithium Ion Conducting Inorganic Powder]

As the lithium ion conducting inorganic powder, a powder of crystallines of LiN, LISICON and derivatives thereof, $La_{0.55}Li_{0.35}TiO_3$, $LiTi_2P_3O_{12}$, $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is one or more elements selected from among Al and Ga) or a powder of a glass ceramic in which these crystallines are precipitated is preferable since lithium ion conductivity thereof is high.

Here, a glass ceramic refers to a material to be obtained as a crystalline phase is precipitated in a glass phase during the heat treatment of a glass and has an amorphous solid and a crystalline. Since the glass ceramic has hardly any vacancies or crystal grain boundaries that obstruct ion conduction, it has a high ion conducting property and an excellent chemical stability so as to be more preferable. The glass ceramic also includes a material of which entire glass phase is changed into a crystalline phase, that is, the material has 100 wt % of crystalline amount (crystallinity) in the material. These have hardly any vacancies between crystalline particles and within crystallines. In regard to the ion conduction, a ceramic in particular has a considerably lower conductivity value than that of the crystalline particle because of the existence of vacancies and crystal grain boundaries. Since it is possible to prevent the decrease of the ion conductivity between crystal grains by controlling the crystallization process of the glass ceramics, the ion conductivity of the entire body can be kept as much as that of the crystalline itself.

Among the abovementioned lithium ion conducting inorganic powders, a powder of a glass ceramic in which crystallines of $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is one or more elements selected from among Al and Ga) are precipitated is most preferable since it has a high lithium ion conductivity and a chemically stable property as well.

A glass ceramic having the above-described crystallines, that is, a glass ceramic in which crystallines of $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is one or more elements selected from among Al and Ga) are precipitated as a crystalline phase can be obtained by heat treating a base glass for a crystalline phase to precipitate therein after the base glass is produced by melting and then rapidly cooling a raw glass containing respective mol concentrations of components on the oxide basis as follows:

10 to 25 mol % of $Li_2O$;
0.5 to 15 mol % of $Al_2O_3$ and/or $Ga_2O_3$;
25 to 50 mol % of $TiO_2$ and/or $GeO_2$;
0 to 15 mol % of $SiO_2$; and
26 to 40 mol % of $P_2O_5$.

A green sheet may be prepared using the above-described glass as the lithium ion conducting inorganic powder. In this case, the above-described crystallines precipitate during sintering of the green sheet and the glass, thereby exhibits a high ion conductivity.

The lithium ion conducting inorganic powder is prepared by milling the above-described lithium ion conducting inorganic substance by a ball mill, jet mill, etc. To increase a filling factor, an average particle diameter of the lithium ion conducting inorganic powder in a process of mixing with the organic binder is preferably not exceeding 5 µm, more preferably not exceeding 3 µm, and most preferably not exceeding 1 µm. To achieve uniform dispersion, the lower limit value of the average particle diameter of the lithium ion conducting inorganic powder is preferably at least 0.01 µm, more preferably at least 0.05 µm, and most preferably at least 0.1 µm.

Here, the average particle diameter is a value of D50 (diameter at a cumulative volume percentage of 50%) measured by a laser diffraction method, and specifically, a value measured using a particle size distribution measurement device LS100Q or a submicron particle analyzer N5, manufactured by Beckman Coulter, Inc., as a measurement device may be used. The average particle diameter is a value expressed on the basis of volume. Depending on the particle diameter range of an object to be measured, the abovementioned measurement devices are selectively utilized. When the maximum particle diameter of the object to be measured is less than 3 µm, measurement is made using just the submicron particle analyzer N5.

The lower limit value of the content of the lithium ion conductive inorganic powder may be preferably at least 50 wt %, more preferably at least 55 wt %, and most preferably at least 60 wt % of the amount of a mixed slurry constituted of the inorganic powder, the organic binder, a plasticizer, a solvent, etc. when the oxide glass is mixed with the organic binder, in order to reduce the number of voids after sintering.

To maintain the sheet shape, the upper limit value of the content of the lithium ion conductive inorganic powder is preferably not exceeding 97 wt %, more preferably not exceeding 95 wt %, and most preferably not exceeding 93 wt % of the amount of the mixed slurry.

[Organic Binder]

As the organic-based binder, a general purpose binder that is commercially available as a shaping additive for press molding, rubber pressing, extrusion, or injection molding may be used. More specifically, acrylic resin, ethyl cellulose, polyvinyl butyral, methacrylic resin, urethane resin, butyl methacrylate, vinyl-based copolymer, etc., may be utilized.

In order to make it easier to maintain the sheet shape, the lower limit value of the content of the organic binder may be preferably at least 1 wt %, more preferably at least 3 wt %, and most preferably at least 5 wt % of the amount of the mixed slurry constituted of the active material power (in the case of the positive electrode green sheet or the negative electrode green sheet), inorganic material powder, the organic binder, the plasticizer, the solvent, etc.

Also, the lower limit value of the content of the organic binder in the dried green sheet may be preferably at least 3 wt %, more preferably at least 5 wt %, and most preferably at least 7 wt % for the same reason as mentioned above. In order to make it easier to reduce the volume fraction of voids after burnout (removing the organic material), the upper limit value of the content of the organic binder may be preferably not exceeding 50 wt %, more preferably not exceeding 40 wt %, and most preferably not exceeding 30 wt %.

Also, the upper limit value of the content of the organic binder in the dried green sheet may be preferably not exceeding 40 wt %, more preferably not exceeding 35 wt %, and most preferably not exceeding 30 wt % for the same reason as mentioned above.

[Solvent]

The solvent may be used to disperse the lithium ion conducting inorganic powder uniformly. Although publicly known material such as PVA (polyvinyl alcohol), IPA (isopropyl alcohol), butanol, toluene, xylene, acetonitrile, NMP (N-methylpyrrolidone), etc., may be used as the solvent, alcohol or water is preferable in terms of the environment. Furthermore to obtain a uniform, dense solid electrolyte, an appropriate amount of a dispersant may be added along with the lithium ion conducting inorganic powder and the organic binder, and an appropriate amount of a surfactant, etc., may be added to carry out bubble elimination satisfactorily during mixing and drying.

[Others]

The green sheet may also contain a Li-containing inorganic compound at the same time. The Li-containing inorganic compound may work as a sintering additive (binder) and may be effective in binding the glass ceramic particles.

The inorganic compound including Li, for example, may comprise $Li_3PO_4$, $LiPO_3$, $LiI$, $LiN$, $Li_2O$, $Li_2O_2$, $LiF$, etc. It is possible to soften or melt these Li-containing inorganic compounds in particular by adjusting the sintering temperature and atmosphere when these compounds are sintered after mixed with the lithium ion conductive inorganic powder. Some of the softened or molten Li-containing inorganic compounds may flow into gaps in the lithium ion conducting inorganic powder, and can strongly bind the oxide glass or the glass ceramic.

Addition of a small amount of a highly dielectric, insulating crystalline or glass as an inorganic powder to the green sheet improves a lithium ion diffusion property, thereby providing an effect to improve the lithium ion conducting property. For example, such inorganic powder may include power of $BaTiO_3$, $SrTiO_3$, $Nb_2O_5$, $LaTiO_3$, etc.

[Manufacture of Green Sheet]

As to shaping of the green sheet, a publicly know method such as a doctor blade method and calendar method may be utilized to make the green sheet in a sheet form. In order to minimize an internal residual solvent amount in a drying step to prevent formation of cracks on a surface, the upper limit value of the thickness of the green sheet after shaping may be preferably not exceeding 200 μm, more preferably not exceeding 150 μm, and most preferably not exceeding 100 μm. To provide a stable handling property, the lower limit value of the thickness of the green sheet is preferably at least 0.1 μm, more preferably at least 0.5 μm, and most preferably at least 1 μm. The green sheet may be formed in any shape as appropriate. To make the solid electrolyte in the desired thickness after sintering, a plurality of green sheets may be laminated. Also, to improve denseness of the solid electrolyte much more after sintering, the green sheet may be pressed by a roll press or by uniaxial compression, isotropic compression, etc.

To shorten a sintering time, the upper limit value of the thickness of the laminated green sheets is preferably not exceeding 800 μm, more preferably not exceeding 600 μm, and most preferably not exceeding 400 μm. To reduce waviness, the lower limit value of the thickness of the laminated green sheets is preferably at least 0.5 μm, more preferably at least 1 μm, and most preferably at least 5 μm.

The solid electrolyte green sheet obtained here is further laminated with at least one of the positive electrode green sheet and the negative electrode green sheet to prepare the laminate. Or as mentioned above, another sheet may be directly formed on the green sheet to be laminated together or on a ceramic, etc.

[Sintering]

A step of sintering (sintering step) is then performed with respect to the shaped green sheets. The sintering step includes a degreasing (burning-off) step and a sintering step. In the degreasing step, the green sheets are treated at a high temperature and the organic binder and other components other than the constituting inorganic substance are gasified and discharged out of the green sheets. In the sintering step, the green sheets are treated at an even higher temperature than in the degreasing step to fuse the inorganic substance particles constituting the green sheets. In both the degreasing step and the sintering step, ventilation is preferably performed to keep the atmosphere inside the furnace constant.

Although the sintering step may be carried out using a gas furnace, a microwave furnace, or other known sintering furnace, use of an electric furnace is preferable from reasons of environment, internal temperature distribution of the furnace, cost, etc.

In regard to a treatment temperature (degreasing temperature) in the degreasing step, since it is necessary to burn the binder and decompose it, the lower limit value is preferably at least 300° C., more preferably at least 320° C., and most preferably at least 340° C. Since the green sheet may be deformed by the gas generated in the burning and decomposing the binder if the temperature is raised rapidly, the upper limit value of the degreasing temperature is preferably not exceeding 700° C., more preferably not exceeding 650° C., and most preferably not exceeding 600° C.

Since the density may become higher and the ion conductivity accordingly may become higher if the treatment temperature (sintering temperature) in the sintering step is higher, the lower limit value of the sintering temperature (in the sintering step) is preferably at least 750° C., more preferably at least 800° C., and most preferably at least 850° C. However, the upper limit value is preferably not exceeding 1250° C., more preferably not exceeding 1200° C., and most preferably not exceeding 1150° C. since the crystallines having a high ion conducting property may be decomposed if the sintering (sintering) temperature is too high.

To facilitate obtaining a lithium secondary battery having high capacity and high output, the lithium ion conductivity of the solid electrolyte is preferably at least $1 \times 10^{-4}$ Scm$^{-1}$, more preferably at least $3 \times 10^{-4}$ Scm$^{-1}$, and most preferably at least $5 \times 10^{-4}$ Scm$^{-1}$.

To facilitate obtaining a high lithium ion conductive solid electrolyte, the solid electrolyte preferably contains crystallines of $Li_{1+x+z}M_x(Ge_{1-y}Ti_y)_{2-x}Si_zP_{3-z}O_{12}$ (where $0 \leq x \leq 0.8$, $0 \leq y \leq 1.0$, $0 \leq z \leq 0.6$, and M is one or more elements selected from among Al and Ga). Also, from the standpoint of chemical durability and resistance against inflammability, the solid electrolyte is preferably composed of only the lithium ion conducting inorganic substance.

In case the electrolyte is utilized in a battery, the upper limit value of the thickness of the solid electrolyte is preferably not exceeding 300 μm, more preferably not exceeding 200 μm, and most preferably not exceeding 150 μm since the battery of higher output can be obtained when a transfer distance of lithium ions is shorter. For the easiness in handling, the lower limit value of the solid electrolyte of the present invention is preferably at least 1 μm, more preferably at least 3 μm, and most preferably at least 5 μm.

EXAMPLE 1

Applying the processes as described above, a battery was prepared in the way to be described more specifically below.

[Preparation of Amorphous Oxide Glass Powder]

The following raw materials were used: $H_3PO_4$, $Al(PO_3)_3$, and $Li_2CO_3$, manufactured by Nippon Chemical Industrial Co., Ltd.; $SiO_2$, manufactured by Nitchitsu Co., Ltd.; and $TiO_2$, manufactured by Sakai Chemical Industry Co., Ltd. These materials were weighed out to provide a composition of 35.0% $P_2O_5$, 7.5% $Al_2O_3$, 15.0% $Li_2O$, 38.0% $TiO_2$, and 4.5% $SiO_2$, respectively in mol % as the oxide, and mixed uniformly, and thereafter placed in a platinum pot and heated and fused for 3 hours while stirring at a temperature of 1500° C. in an electric furnace to obtain a glass melt. The glass melt was thereafter quenched as the melt being heated was dripped from a platinum pipe mounted on the pot into running water at the room temperature to obtain an oxide glass.

The oxide glass was milled by a jet mill manufactured by Kurimoto Ltd., then placed in a ball mill and subject to wet milling using ethanol as a solvent to obtain oxide glass powder having an average particle diameter of 0.5 μm and a maximum particle diameter of 1 μm.

When the glass before milling was placed in an electric furnace at 1000° C. to perform crystallization and then subject to measurement of the lithium ion conductivity, the conductivity was found to be $1.3 \times 10^{-3}$ Scm$^{-1}$ at a room temperature. For measurement of the lithium ion conductivity, an impedance analyzer SI-1260, manufactured by Solartron Analytical, was used, and the conductivity was computed upon making a complex impedance measurement by an AC two terminal method. The precipitated crystalline phase was measured using a powder X-ray diffraction measurement device manufactured by Phillips Corp., and it was confirmed that the glass was a glass ceramic having $Li_{1+x+y}Al_xTi_{2-x}Si_yP_{3-y}O_{12}$ (where $0 \leq x \leq 0.4$ and $0 \leq y \leq 0.6$) as a main crystalline phase.

[Manufacture of Electrolyte Green Sheet]

An electrolyte slurry was prepared using water as a solvent and dispersing and mixing the above-prepared oxide glass of 0.5 μm average particle diameter with an acrylic-based binder, a dispersant, and an antifoaming agent. The slurry was decompressed to eliminate bubbles and thereafter shaped using a doctor blade and dried to prepare an electrolyte green sheet having a thickness of 25 μm.

[Manufacture of Positive Electrode Green Sheet]

As a positive electrode active material, $LiFePO_4$ of Nihon Alliance Nano Technologies Co., Ltd. was used. A $LiFePO_4$ powder and the above-prepared oxide glass of 0.5 μm average particle diameter were weighed out at proportions of 80:20 wt %, and dispersed and mixed with the acrylic-based binder and the dispersant using water as the solvent to prepare a positive electrode slurry. The slurry was decompressed to eliminate bubbles and thereafter shaped using a doctor blade and dried to prepare a positive electrode green sheet having a thickness of 25 μm.

[Manufacture of Negative Electrode Green Sheet]

As a negative electrode active material, $Li_4Ti_5O_{12}$, manufactured by Ishihara Sangyo Kabushiki Kaisha, Ltd., was used after annealing it at 500° C. A $Li_4Ti_5O_{12}$ powder of 5 μm average particle diameter and the above-prepared oxide glass of 0.5 μm average particle diameter were weighed out at proportions of 80:20 wt %, and dispersed and mixed with the acrylic-based binder and the dispersant using water as the solvent to prepare a negative electrode slurry. The slurry was decompressed to eliminate bubbles and thereafter shaped using a continuous roll coater and dried to prepare a negative electrode green sheet having a thickness of 25 μm.

[Manufacture of Green Sheet Laminate]

Each of the positive electrode, electrolyte, and negative electrode green sheets prepared as described above was cut to 70 mm square sheets. The cut green sheets were then laminated in the order of: two positive electrode green sheets, four electrolyte green sheets, and two negative electrode green sheets such that the laminated sheets were pressed and densified at a temperature of 80° C. using a WIP (warm isostatic press), made by Nikkiso Co., Ltd. Thus, the green sheet laminate before sintering was prepared.

[Sintering of Green Sheet Laminate]

The laminate prepared as described above was placed on a dense alumina setter (manufactured by NORITAKE CO., LIMITED) having a 100-mm square size, a 2-mm thickness, a porosity of not exceeding 1%, the maximum pore diameter of 0.2 μm, and an average pore diameter of not exceeding 0.1 μm as the negative electrode side of the laminate was faced down so as to make the negative electrode green sheet contact the setter. A highly gas permeable alumina setter (manufactured by KIKUSUI Chemical Industries Co., Ltd.) having a 100-mm square size, a 2-mm thickness, a porosity of 35% the maximum pore diameter of 120 μm, and an average pore diameter of 80 μm was placed on the negative electrode side of the laminate. Thus, the positive electrode green sheet was made to contact with the setter more gas-permeable. In this state, the laminate was heated up to 400° C. in an electric furnace to eliminate the binder, dispersant, and other organic substances inside the laminate. Thereafter, the temperature was rapidly raised up to 900° C. as a low oxygen concentration (about 5% oxygen concentration) gas mixed with pure nitrogen and air at the ratio of 4:1 flowed inside the electric furnace, the temperature was held for 5 minutes, and immediately thereafter cooling was performed so as to obtain a sintered laminate body comprised of the positive electrode, the electrolyte, and the negative electrolyte.

[Manufacture of All Solid State Lithium Ion Secondary Battery]

A positive electrode current collector was fixed to the positive electrode side by coating an aluminum paste onto the positive electrode side of the sintered laminate prepared as described above and then applying the current collector on the coated aluminum paste, and drying and sintering the assembly. A negative electrode current collector was also fixed to the negative electrode side by printing a copper paste onto the negative electrode side, applying the current collector on the printed copper paste, and then drying and sintering the assembly. An aluminum foil was connected as a positive electrode lead to the positive electrode side, a copper foil was connected as a negative electrode lead to the negative electrode side, and the laminate was sealed in an aluminum laminate film having an insulative coating on the interior so as to prepare a lithium ion battery. The prepared battery discharged at an average voltage of 2.5 V and was a rechargeable battery.

EXAMPLE 2

A green sheet laminate before sintering was prepared using the same composition and in the same method as described in Example 1.

The laminate prepared as described above was placed on a dense alumina setter (manufactured by NORITAKE CO., LIMITED) having a 100-mm square size, a 2-mm thickness, a porosity of not exceeding 1%, the maximum pore diameter of 0.2 μm, and an average pore diameter of not exceeding 0.1 μm as the positive electrode side of the laminate was faced down so as to make the positive electrode green sheet contact the setter. A highly gas permeable alumina setter (manufactured by KIKUSUI Chemical Industries Co., Ltd.) having a porosity of 35%, the maximum pore diameter of 120 μm, and an average pore diameter of 80 μm was placed on the negative electrode. The negative electrode green sheet was made to contact with the highly gas permeable setter. In this state, the laminate was heated up to 400° C. in an electric furnace to eliminate the binder, dispersant, and other organic substances inside the laminate. Thereafter, the temperature was rapidly raised up to 900° C. as a higher oxygen concentration (about 24% oxygen concentration) gas mixed with air and oxygen at the ratio of 4:1 flowed inside the electric furnace, then, the temperature was held for 5 minutes, and immediately thereafter cooling was performed so as to obtain a sintered laminate body comprised of the positive electrode, the electrolyte, and the negative electrolyte.

[Manufacture of All Solid State Lithium Ion Secondary Battery]

A positive electrode current collector was fixed to the positive electrode side by coating an aluminum paste onto the positive electrode side of the sintered laminate prepared as described above and then applying the current collector on the coated aluminum paste, and drying and sintering the assembly. A negative electrode current collector was also fixed to the negative electrode side by printing a copper paste onto the negative electrode side, applying the current collector on the printed copper paste, and then drying and sintering the assembly. An aluminum foil was connected as a positive electrode lead to the positive electrode side, a copper foil was connected as a negative electrode lead to the negative electrode side, and the laminate was sealed in an aluminum laminate film having an insulative coating on the interior so as to prepare a lithium ion battery. The prepared battery discharged at an average voltage of 2.5 V and was a rechargeable battery.

Since sintering is performed after placing a dense alumina setter on the furnace floor and disposing the laminate on the setter as described above, none of the negative electrode green sheet and the positive electrode green sheet set on the lower side of the laminate, and the negative electrode active material and the positive electrode active material react directly with the surface of the furnace floor. And the negative electrode green sheet or the positive electrode green sheet hardly reacts with respective contacting setters. Since the ambient gas hardly circulate to visit such a negative electrode or positive electrode surface, substances of the surface of the negative electrode or positive electrode hardly have interactions such as reactions with the ambient gas. On the other hand, since the setter being placed on the upper side of the laminate has higher gas permeability, the positive electrode green sheet or the negative electrode green sheet on the upper side readily undergoes reaction with the ambient gas. For example, in Example 1, since an oxidizing property of the atmosphere was low, the positive electrode green sheet on the upper side was sintered in a low oxidizing atmosphere. On the other hand, in Example 2, since the oxidizing property of the atmosphere is higher than that of air, the negative electrode green sheet on the upper side is sintered in a highly oxidizing atmosphere.

As described above, a manufacturing method characterized by the step of sintering the electrode materials of a positive electrode and a negative electrode at the same time is provided. The electrode material of the positive electrode may be bound satisfactorily with the electrolyte green sheet under some desired sintering conditions whereas the electrode material of the negative electrode may be bound satisfactorily with the electrolyte green sheet under different ones.

A method for manufacturing a lithium ion secondary battery comprising the step of sintering a laminate sandwiched by setters disposed on both sides of the laminate is provided. The laminate has only interfaces between an electrolyte green sheet and a positive electrode green sheet and/or a negative electrode green sheet.

Here, a green sheet may mean an unsintered body formed in a thin plate shape with a mixed slurry having been prepared by mixing a powder of ceramics comprising unsintered glass or other inorganic oxide or a combination thereof as a main component with an organic binder, a plasticizer, a solvent, etc. The thin plate shape can be made with the mixed slurry by utilizing a doctor blade or calendar method; coating methods such as spin coating and dip coating; printing method such as inkjet, bubble jet (registered trademark), offset; a die coater method; a spray method; etc. Although the green sheet is generally prepared by applying the mixed slurry onto a PET film or the like and peeling the sheet after the slurry is dried, the slurry may be applied directly onto another green sheet or ceramic to be laminated each other, and the green sheet may also include a layer formed on the other green sheet in such a way. This unsintered green sheet is flexible and can be cut into any shape or laminated with each other.

Here, the glass ceramic is a material obtained by heat treating glass so as to precipitate a crystalline phase in a glass phase, and may include not only material composed of a glass phase and a crystalline phase but also material in which the entire glass phase is converted into a crystalline phase, that is, the material in which the crystalline amount (crystallinity) is 100 wt %. In engineering ceramics or ceramics sintered bodies obtained from generally used powders, the amount of a liquid phase during sintering is quite low such that it is difficult to completely sinter the ceramic body without any pores (pore-free body). These ceramics can thus be distinguished from the glass ceramic as referred to here by such pores (for example, porosity). In regard to the ion conduction, in particular, the ion transfer is prevented by existing vacancies and crystal grain boundaries in the case of the ceramics such that the value of the conductivity of the whole ceramic tends to be low. It is possible to prevent degradation of the conductivity between crystallines in the glass ceramics by controlling the crystallization process. Although a single crystal is a material that has hardly any vacancies or crystal grain boundaries that obstruct the ion conduction, it is extremely difficult and costly to produce the single crystal as compared to manufacturing the glass ceramics.

According to the embodiment of the present invention, the electrolyte green sheet is processed in the sintering step to become the solid electrolyte. However, the pores existing inside the body do not contribute as the ion conduction path such that the ion conductivity of the whole electrolyte is lowered. The battery utilizing such electrolyte can have a high output power since the ion transfer rates of the lithium ions become high when the ion conductivity of the electrolyte is high. Therefore, the porosity of the electrolyte is preferably low such that it is preferably not exceeding 20 vol %, more preferably not exceeding 15 vol %, and most preferably not exceeding 10 vol %.

Here, the porosity is a proportion of vacancies contained in a unit volume and is expressed by the following formula:

$$\text{Porosity}(\%) = (\text{True density} - \text{Apparent density})/\text{True density} \times 100 \quad \text{(Formula 1)}$$

Here, the "true density" may signify a true solid density of the material. Meanwhile, the "apparent density" is a density determined by dividing a weight of an object by an apparent volume and is a density of the object that includes the vacancies (voids).

In the present Specification, the maximum pore diameter is a pore diameter expressed by Formula 2 indicated below and corresponding to a bubble point value $P_b$ measured based on JIS K 3832 "Testing Methods for Bubble Point of Membrane Filters," using water or ethanol as a test liquid and using air or nitrogen as a test gas.

$$d = K4\gamma \cos\theta / P_b \quad \text{(Formula 2)}$$

(where d is a pore diameter, $\gamma$ is a surface tension, $\theta$ is a contact angle of test liquid, $P_b$ is a pressure (bubble point), and K is a capillary constant.

An average pore diameter may be given as a value determined by the following method.

(i) First, a gas pressure is applied from one side of a plate-form solid electrolyte in a dry state, the gas pressure is increased, and a curve (dry flow rate curve) expressing a relationship of a flow rate (dry flow rate $D_n$ [liters/minute]) of gas passing through the plate-form solid electrolyte at a gas pressure $P_n$ is determined.

(ii) Next, after making the plate-form solid electrolyte absorb the test liquid, a contact interface with the test liquid is formed at one side of the plate-form solid electrolyte, a gas pressure is applied from the opposite side, the gas pressure is increased, and a curve (wet flow rate curve) expressing a relationship of a flow rate (wet flow rate $W_n$ [liters/minute]) of gas passing through the plate-form solid electrolyte at a gas pressure $P_n$ is determined.

(iii) The wet flow rate curve and a curve of ½ the flow rate of the dry flow rate curve are overlapped, and a pore diameter corresponding to the pressure $P_n$ at an intersection is determined from Formula 3 as the average pore diameter. Besides those mentioned above, the measurement conditions for the average pore diameter are in compliance with JIS K 3832.

$$d_n = K4\gamma \cos\theta / P_n \quad \text{(Formula 3)}$$

(where d is a pore diameter, $\gamma$ is a surface tension, $\theta$ is a contact angle of test liquid, $P_n$ is pressure, and K is a capillary constant.) The maximum pore diameter and the average pore diameter can be measured using, for example, Pore Size Meter PSM165 (TOPAS GmbH).

The green sheet is preferably formed to have a uniform thickness. This is because the green sheet can then be readily heated uniformly during the sintering. Sintering proceeds along with temperature rise in accordance with the degree of heating, and by heating uniformly, sintering proceeds uniformly and a sheet-form electrolyte green sheet with an extremely low porosity of not exceeding 20 vol % can be obtained as a dense sintered body. A variation of the thickness of the green sheet before sintering is preferably in a range of +10% to −10% with respect to an average value of the thickness distribution of the green sheet before sintering. Furthermore, by making the green sheet uniform in composition by mixing the raw materials adequately and pressurizing and densifying by a roll press, or by uniaxial compression, isotropic compression, etc., before sintering, an electrolyte green sheet that is dense and low in porosity even after sintering can be obtained, and a solid electrolyte of high ion conductivity and high output can thereby be obtained. Thus, preferably, the mixing of the raw materials is performed for at least one hour by a ball mill, for example.

In the present invention, it tends to obtain a battery with high output since the ion transfer distance of the lithium ion is short if the electrolyte layer is thinner when the electrolyte green sheet is utilized to produce the battery. Also, an electrode area per unit volume can be so large that the battery with high capacity may be obtained. Therefore, the thickness of the layer of solid electrolyte is preferably not exceeding 200 μm, more preferably not exceeding 180 μm, and most preferably not exceeding 150 μm.

A mobility of lithium ions during charging/discharging of a lithium ion secondary battery depends on a lithium ion conductivity and a lithium ion transference number of the electrolyte. Thus, it is preferable to use a substance that is high in lithium ion conducting property in the electrolyte green sheet.

The ion conductivity of lithium ion conductive crystalline is preferably at least $1 \times 10^{-4}$ S·cm$^{-1}$, more preferably at least than $5 \times 10^{-4}$ S·cm$^{-1}$, and most preferably at least $1 \times 10^{-3}$ S·cm$^{-1}$.

A lithium ion conductive inorganic powder to be employed in the present embodiment, for example, may comprise: a lithium ion conductive glass powder, a lithium ion conductive crystalline (ceramic or glass ceramic) powder, or an inorganic substance powder containing a mixture powder thereof. It is preferable that the lithium ion conductive inorganic powder contains lithium, silicon, phosphorus, and titanium as main components in order to obtain a high lithium ion conductive property.

It is preferable that the electrolyte green sheet contains at least 50 wt % of lithium ion conductive crystallines because the conductivity thereof may become higher by containing more of these lithium ion conductive crystallines. The content thereof is more preferably at least 55 wt %, and most preferably at least 60 wt %.

Here, as the lithium ion conductive crystallines to be used, crystallines having no crystal boundaries that obstruct the ion conduction have advantages in the ion conductivity. Crystallines having a lithium ion conductive property such as LiN, LISICON, a perovskite structure with La$_{0.55}$Li$_{0.35}$TiO$_3$, etc., crystallines having NASICON type structure such as LiTi$_2$P$_3$O$_{12}$, and glass ceramics having such crystallines precipitated may be utilized. As preferable lithium ion conductive crystallines, for example, crystallines of Li$_{1+x+z}$M$_x$(Ge$_{1-y}$Ti$_y$)$_{2-x}$Si$_z$P$_{3-z}$O$_{12}$ (where $0 \leq x \leq 0.8$, $0 \leq y \leq 1.0$, $0 \leq z \leq 0.6$, and M is one or more elements selected from among Al and Ga) can be used. In particular, glass ceramics, in which crystallines having the NASICON structure are precipitated, are more preferable since they hardly have vacancies or crystal grain boundaries that inhibit ion conduction such that the ion conductivity thereof may be high and the chemical stability thereof is excellent.

The solid electrolyte preferably contains at least 80 wt % of the lithium ion conductive glass ceramics because the conductivity thereof may become higher by containing more of these glass ceramics. The content thereof is more preferably at least 85 wt % and most preferably at least 90 wt %.

Here, vacancies and crystal grain boundaries that inhibit ion conduction may be ion conduction inhibiting substances such as vacancies, crystal grain boundaries, and so on that decrease a conductivity of an entire inorganic substance, including the lithium ion conductive crystallines, to equal to or less than 1/10th of the conductivity of lithium ion conductive crystallines themselves included in the inorganic substance.

It is possible to use the lithium ion conductive glass ceramic in milled form as a lithium ion conductive inorganic powder having a high ion conductivity to be contained in the solid electrolyte layer in the present invention. The lithium ion conductive inorganic powder is preferably dispersed uniformly in the solid electrolyte with respect to the ion conductive property and mechanical strength of the solid electrolyte. In order to provide a good dispersion property and to make the thickness of the solid electrolyte a desired one, the particle diameter of the lithium ion conductive inorganic powder on the average is preferably not exceeding 20 μm, more preferably not exceeding 15 μm, and most preferably not exceeding 10 μm.

Here, a particle diameter (or particle size) is defined as a diameter of a sphere of equivalent sedimentation velocity in a measurement by a sedimentation method or a diameter of a sphere of equivalent diffraction characteristics by a laser diffraction method. A distribution of the particle diameters is the particle size (particle diameter) distribution. In a particle diameter distribution, an average diameter D50 (or average particle diameter D50) is defined by the particle diameter, a cumulative volume of particles having the same as or greater than which is 50% of the entire volume the power. This is described, for example, in JISZ8901 "Test Powders and Test Particles," in Chapter 1, etc., of the Society of Powder Technology, Japan ed. "Fundamental Physical Properties of Powders," (ISBN4-526-05544-1) and other documents. In the present Specification, an integrated frequency distribution according to volume of the particle diameters was measured using laser diffraction type measuring devices (LS100 and N5, manufactured by Beckman Coulter, Inc.). A distribution by volume and a distribution by weight are equivalent. The particle diameter corresponding to 50% in the integrated (cumulative) frequency distribution was determined as the average particle diameter D50. In the present specification, the average particle diameter is based on a median value (D50) of the particle size distribution measured by the abovementioned particle size distribution measuring unit based on the laser diffraction method.

The lithium ion conducting glass ceramics may include those comprising a base glass which has a composition in the Li$_2$O—Al$_2$O$_3$—TiO$_2$—SiO$_2$—P$_2$O$_5$ system. For example, a glass ceramic having Li$_{1+x+z}$M$_x$(Ge$_{1-y}$Ti$_y$)$_{2-x}$Si$_z$P$_{3-z}$O$_{12}$ (where $0 \leq x \leq 0.8$, $0 \leq y \leq 1.0$, $0 \leq z \leq 0.6$, and M is one or more selected from Al and Ga) as a main crystalline phase after the heat treatment for the crystallization may be utilized.

A powder of an active material is contained in the positive electrode green sheet. Here, as the active material to be used in the positive electrode green sheet, a transition metal compound capable of storing (or adsorbing) and releasing (or desorbing) Li ions may be used and, for example, a transition metal oxide, etc., containing at least one element selected from among the group consisting of manganese, cobalt, nickel, vanadium, niobium, molybdenum, titanium, iron, phosphorus, aluminum, and chromium may be used. With respect to the lower content limit of the active material contained in the positive electrode green sheet, the content is preferably equal to or more than 40 wt %, more preferably equal to or more than 50 wt %, and most preferably equal to or more than 60 wt % since a battery capacity per unit volume after sintering decreases if the content is low. Also because plasticity is lost and handling becomes difficult if the content of the active material contained in the positive electrode sheet is too high, the content is preferably equal to or less than 97 wt %, more preferably equal to or less than 94 wt % and most preferably equal to or less than 90 wt %.

A powder of an active material is contained in the positive electrode green sheet. Here, as the active material to be used in the positive electrode green sheet, a transition metal compound capable of storing (or adsorbing) and releasing (or desorbing) Li ions may be used and, for example, a transition metal oxide, etc., containing at least one element selected from among the group consisting of manganese, cobalt, nickel, vanadium, niobium, molybdenum, titanium, iron, phosphorus, aluminum, and chromium may be used. With respect to the lower content limit of the active material contained in the positive electrode green sheet, the content is preferably equal to or more than 40 wt %, more preferably equal to or more than 50 wt %, and most preferably equal to or more than 60 wt % since a battery capacity per unit volume after sintering decreases if the content is low. Also because plasticity is lost and handling becomes difficult if the content of the active material contained in the positive electrode sheet is too high, the content is preferably equal to or less than 97 wt %, more preferably equal to or less than 94 wt % and most preferably equal to or less than 90 wt %.

To obtain the positive electrode green sheet with the above-mentioned content of the active material and to prepare a slurry that can be coated satisfactorily, the amount of the positive electrode active material with respect to the amount of the mixed slurry constituted of the positive electrode active material powder, an inorganic powder, an organic binder, a plasticizer, a solvent, etc., is preferably equal to or more than 10 wt %, more preferably equal to or more than 15 wt %, and most preferably equal to or more than 20 wt %.

To prepare a slurry that can be coated satisfactorily, the upper content limit of the active material with respect to the amount of the mixed slurry is preferably equal to or less than 90 wt %, more preferably equal to or less than 80 wt %, and most preferably equal to or less than 75 wt %.

In a case where an electron conducting property of the positive electrode active material is low, the electron conducting property can be increased by adding an electron conducting additive. As the electron conducting additive, a microparticulate or fibrous carbon material or metal may be used. Metals that can be used include metals, such as titanium, nickel, chromium, iron, stainless steel, aluminum, etc., and noble metals, such as platinum, gold, rhodium, etc.

Meanwhile, a powder of an active material is contained in the negative electrode green sheet in addition to the above-mentioned materials. As the active material used in the negative electrode green sheet, an alloy of aluminum, silicon, tin, etc., capable of storing (or adsorbing) and releasing (or desorbing) Li ions or a metal oxide material of titanium, vanadium, chromium, niobium, silicon, etc., may be contained.

The lower content limit of the active material contained in the negative electrode green sheet is preferably equal to or more than 40 wt %, more preferably equal to or more than 50 wt %, and most preferably equal to or more than 60 wt % since the battery capacity per unit volume after sintering decreases if the content is low.

Also, the lower content limit of the active material contained in the negative green sheet is preferably equal to or more than 10 wt %, more preferably equal to or more than 15 wt %, and most preferably equal to or more than 20 wt % with respect to the amount of the mixed slurry constituted of the positive electrode active material powder, the inorganic powder, the organic binder, the plasticizer, the solvent, etc. because of the reason described above and in order to prepare the slurry that can be coated satisfactorily.

Also, the upper content limit of the active material with respect to the amount of the mixed slurry is preferably equal to or less than 90 wt %, more preferably equal to or less than 80 wt %, and most preferably equal to or less than 75 wt % since the slurry must be prepared using the binder and the solvent.

Also, in the case where the electron conducting property of the negative electrode active material is low, the electron conducting property can be imparted by adding an electron conducting additive. As the electron conducting additive, a microparticulate or fibrous carbon material or metal may be used. Metals that can be used include metals, such as titanium, nickel, chromium, iron, stainless steel, aluminum, etc., and noble metals, such as platinum, gold, rhodium, etc.

Preferably, a lithium ion conducting inorganic powder is added to the positive electrode green sheet and the negative electrode green because ion conductivity is thereby imparted. Specifically, the lithium ion conducting glass ceramic described above may be contained. More preferably, the same ion conducting inorganic substance contained in the solid electrolyte green sheet is added. When the same material is contained, an ion transfer mechanism in the electrolyte and the electrode materials can be made in common to make it possible for ion transfer between the electrolyte and the electrodes to proceed smoothly. A battery of higher output and higher capacity can thereby be provided.

The step of preparing the laminate may include overlaying and sandwiching of a plurality of the electrolyte green sheets that are thin. Also, a plurality of the positive electrode green sheets or the negative electrode green sheets that are thin may be used to sandwich the electrolyte green sheet from both sides.

The sintering step includes a degreasing (burning-off) step and a sintering step. In the degreasing step, the green sheets are treated at a high temperature and the organic binder and other components other than the constituting inorganic substance are gasified and discharged out of the green sheets. In the sintering step, the green sheets are treated at an even higher temperature than in the degreasing step to fuse the inorganic substance particles constituting the green sheets. In both the degreasing step and the sintering step, ventilation is preferably performed to keep the atmosphere inside the furnace constant.

The size of the setter may be determined based on the size of the laminate. The size of the setter is preferably approximately such that at least one surface (upper surface or lower surface, etc.) of the laminate can be covered. However, depending on the conditions, the setter may be small such that the setter sandwiches the laminate with a portion of the laminate protruding. Also, to improve surface uniformity of the laminate to be baked and to suppress formation of dimples or waviness in accompaniment with shrinkage in the sintering step, a contacting surface (upper surface or lower surface) of the setter is preferably low in unevenness. A material of the setter is not restricted in particular as long as it has chemical stability and can maintain its shape in a green sheet sintering temperature range. A glass, glass ceramic, or ceramic is preferable in that the above characteristics can be obtained readily and a desired porosity (or vacancy factor) can be designed readily. For example, quartz, alumina, zirconia, cordierite, aluminum titanate, yttria, magnesia, mullite, calcia, etc., may be included. A positive electrode setter and a negative electrode setter may be of the same material, shape, size, etc., or these may differ between the two.

The method for manufacturing lithium ion secondary battery as described above is characterized in that the setters have an average pore diameter of 0 to 100 μm can be provided.

The method for manufacturing lithium ion secondary battery as described above characterized in that at least one of the setters has a maximum pore diameter of 0 to 200 μm can be provided.

The method for manufacturing lithium ion secondary battery as described above characterized in that at least one of the setters has a porosity of 0 to 75% can be provided.

The method for manufacturing lithium ion secondary battery as described above characterized in that the setters disposed at respective sides of the laminate have different porosities can be provided can be provided.

As the setters having different porosities, for example, a dense setter, constituted of a dense body, and a porous setter, constituted of a porous body, may be used. With a dense body setter, because a proportion of pores contained is low (the porosity is low), an amount of the atmosphere (gas) inside the furnace that is made to permeate to the covered positive electrode or negative electrode surface is low. On the other hand, with the porous body setter, because the proportion of pores contained is high (the porosity is high), the amount of the atmosphere (gas) inside the furnace that is made to permeate to the covered positive electrode or negative electrode surface is high. In the sintering step, because the positive electrode surface and the negative electrode surface are respectively put in contact with and covered by the dense body setter and the porous body setter (or the porous body setter and the dense body setter), the amounts of permeation of the sintering atmosphere (gas) to the respective surfaces differ. Actual atmosphere (gas) concentrations at the positive electrode surface and the negative electrode surface of the laminate thus differ. That is, if sintering is to be performed in an atmosphere of lower oxygen content, contacting with the dense body setter (of low porosity) is preferable. On the other hand, if sintering is to be performed in an atmosphere of higher oxygen content, contacting with the porous body setter (of high porosity) is preferable.

In regard to the setters, the above-described atmosphere control is enabled by selecting appropriate setters from among setters having an average pore diameter in a range of 0 to 100 μm, a maximum pore diameter in a range of 0 to 200 μm, and a porosity in a range of 0 to 75%. When the average pore diameter exceeds 100 μm, the setter itself is low in strength and may not be able to maintain the shapes of the laminated green sheets. This also applies when the maximum pore diameter exceeds 200 μm, and furthermore in this case, the setter may become readily attached to the surface of the laminate when a load is applied to the setter. When the porosity exceeds 75%, the setter is low in strength and may not be able to maintain the shapes of the laminated green sheets.

A material of high thermal conductivity may be used in the dense body setter and the porous body setter. Therefore, the sintering step is enabled under rather uniform temperature in this case. Because the dense body setter (of low porosity) is low in the proportion of closed pores contained, it is anticipated to be higher in thermal conductivity than the porous setter (of high porosity). Thus when the setters are heated in likewise manner inside a high temperature furnace, the surface of the laminate in contact with the dense body setter tends to become high in temperature more quickly. Thus, by selecting appropriate setters, thermal histories can be changed even upon loading into the same furnace. For example, in a case where materials differing in melting point are used in the positive electrode and the negative electrode, the sintering step can be carried out while preventing melting of the material of lower melting point. Such setters are favorably used to perform integral sintering of a laminate containing different materials.

In sintering the green sheets, the organic binder and other components contained in the green sheets other than the inorganic substance may be gasified and eliminated from the green sheets. Thus, depending on the conditions, it may be preferable for the setters to have a gas permeability that smoothens dissipation of decomposition gases generated during sintering of the green sheets and prevents formation of pinholes and dimples due to localized failure of gas ventilation. Because such a gas permeability gene-rally increases as the porosity increases, there are cases where it is preferable to use setters of high porosity.

The porosities of the positive electrode setter and the negative electrode setter are thus determined and can be changed as appropriate according to the material and size of the green sheets, the decomposition gases generated, the ambient atmosphere, temperature, and other sintering conditions, etc.

The method for manufacturing lithium ion secondary battery as described above characterized in that the laminate comprises the negative electrode green sheet and the setters disposed on the respective sides of the laminate have different average pore diameters can be provided.

When setters differing in average pore diameter (also referred to as "size") are used for the positive electrode and the negative electrode, the same actions as those in the case of using setters differing in porosity can be considered. That is, the atmosphere (gas) permeation amount is low when the average pore diameter is small and high when the average pore diameter is large. However, in the case where the porosities differ, this relationship does not necessarily hold. This is because when a large number of microscopic pores are opened, the average pore diameter is small even when the porosity is high. The ambient atmosphere (gas) permeation amounts into the positive electrode or negative electrode surface may be determined upon judging these factors comprehensively. A low oxygen atmosphere or a high oxygen atmosphere can thus be selected as appropriate according to the permeation amount.

The method for manufacturing lithium ion secondary battery as described above characterized in that the laminate comprises the positive electrode green sheet and the setter disposed on the positive electrode side (hereinafter referred to as the "positive electrode setter") has a porosity of at least 20% can be provided.

The method for manufacturing lithium ion secondary battery as described above characterized in that the laminate comprises the positive electrode green sheet and the positive electrode setter has an average pore diameter of at least 0.5 μm can be provided.

The method for manufacturing lithium ion secondary battery as described above characterized in that the laminate comprises the negative electrode green sheet and the setter disposed on the negative electrode side (hereinafter referred to as the "negative electrode setter") has a porosity of not exceeding 5% can be provided.

The method for manufacturing lithium ion secondary battery as described above characterized in that the laminate comprises the negative electrode green sheet and the negative electrode setter has an maximum pore diameter of at least 0.5 μm can be provided.

Because the positive electrode setter has a porosity of at least 20% and an average pore diameter of at least 0.5 μm, the atmosphere (gas) in the furnace can pass through the positive electrode setter comparatively readily. An oxidation reaction in which the oxygen gas contained in the atmosphere (gas) inside the furnace reacts with the positive electrode green sheet of the laminate thus occurs readily. On the other hand, because the negative electrode setter has a porosity of not exceeding 5% and a maximum pore diameter of not exceeding 0.5 μm, it is comparatively difficult for the atmosphere (gas) in the furnace to permeate through the negative electrode setter. With the negative electrode green sheet, the thickness is small in comparison to the sizes of the upper surface and the lower surface and it is thus considered that hardly any permeation of the atmosphere (gas) occurs from the side surfaces. This is not the case when special channels (grooves, holes, etc.) are formed into the interior. An oxidation reaction due to the atmosphere (gas) in the furnace can thus be prevented effectively at the negative electrode side surface of the green sheet of the laminate.

When the positive electrode setter has a porosity of less than 20% and an average pore diameter of less than 0.5 μm, the atmosphere gas can hardly pass through readily to the positive electrode during sintering. The positive electrode setter more preferably has a porosity of at least 25% and an average pore diameter of at least 30 μm and most preferably has a porosity of at least 35% and an average pore diameter of at least 1 μm.

When the negative electrode setter has a porosity exceeding 5% and a maximum pore diameter exceeding 0.5 μm, the atmosphere gas passes through to the negative electrode during sintering.

The method for manufacturing lithium ion secondary battery as described above characterized in that the laminate includes the negative electrode green sheet and the negative electrode setter has a porosity of at least 30% can be provided.

The method for manufacturing lithium ion secondary battery as described above characterized in that the laminate includes the negative electrode green sheet and the negative electrode setter has an average pore diameter of at least 0.5 μm can be provided.

The method for manufacturing lithium ion secondary battery as described above characterized in that the laminate includes the positive electrode green sheet and the positive electrode setter has a porosity of not exceeding 5% can be provided.

The method for manufacturing lithium ion secondary battery as described above characterized in that the laminate comprises the positive electrode green sheet and the positive electrode setter has an average pore diameter of not exceeding 0.5 μm can be provided.

Here, in the same manner as described above, the reaction at the positive electrode or negative electrode surface can be controlled by suitably selecting the setters according to the atmosphere (gas) permeation amount (because setters of opposite types are selected for the positive and negative electrodes, opposite effects are provided at the positive and negative electrodes). Although up until now, the atmosphere inside the furnace was deemed to be oxidizing, it may be reducing instead. In this case, to avoid a reducing property, a setter of small porosity and pore diameter may be selected, and oppositely if a reducing property is desired, a setter of large porosity and pore diameter may be selected. With respect to the configurations of the above description, the effects and preferable ranges described above may be reversed for the positive electrode and the negative electrode.

The method for manufacturing lithium ion secondary battery as described above characterized in that the laminate comprises the positive electrode green sheet and the negative electrode green sheet, the porosity of the positive electrode setter is greater than the porosity of the negative electrode setter, and the sintering atmosphere has an oxygen concentration of not exceeding 10% in the sintering process can be provided.

Here, the sintering atmosphere may include an oxidizing atmosphere and a non-oxidizing atmosphere. The oxidizing atmosphere may signify an atmosphere at least containing a component that causes an oxidation reaction. For example, an atmosphere containing oxygen can be deemed to be an oxidizing atmosphere. On the other hand, the non-oxidizing atmospheres signify an atmosphere that does not contain a component that causes an oxidation reaction. For example, an atmosphere that does not contain oxygen may be included. The non-oxidizing atmosphere may also be an atmosphere including at least one type of gas among nitrogen and inert gases. An atmosphere that lowers a concentration of oxidation of the substance to be sintered may be handled as a non-oxidizing atmosphere even if it is an atmosphere containing oxygen.

By making the porosity of the positive electrode setter greater than the porosity of the negative electrode setter and making the sintering atmosphere have an oxygen concentration of not exceeding 10%, the oxidation reaction at the positive electrode surface can be made to proceed more gradually than in a case where sintering is performed in air. Also, with the negative electrode setter having a low porosity, it is considered that sintering with the oxidation reaction being more suppressed can be performed. To obtain the above effects, an oxygen concentration of not exceeding 10% is preferable and an oxygen concentration of not exceeding 5% is most preferable.

The method for manufacturing lithium ion secondary battery as described above characterized in that the laminate comprises the positive electrode green sheet and the negative electrode green sheet, the porosity of the negative electrode setter is greater than the porosity of the positive electrode setter, and the sintering atmosphere has an oxygen concentration of at least 20% in the sintering process can be provided.

By making the porosity of the negative electrode setter greater than the porosity of the positive electrode setter and making the sintering atmosphere have an oxygen concentration of at least 20%, sintering can be performed with the negative electrode surface being in an oxidizing atmosphere in comparison to the positive electrode in contrast to a case where sintering is performed in air. To obtain the above effects, an oxygen concentration of at least 20% is preferable and an oxygen concentration of at least 22% is most preferable.

The method for manufacturing lithium ion secondary battery as described above where each of the positive electrode setter and the negative electrode setter comprises a ceramic, a glass, a crystallized glass, a metal, or a composite material of these can be provided.

A lithium ion secondary batter manufactured by the method recited in described above.

The present invention includes the steps of: preparing the electrolyte green sheet and both or either of the positive electrode green sheet and the negative green sheet; preparing a laminate by contacting and laminating both or either of the positive electrode green sheet and the negative green sheet with and on the electrolyte green sheet; and sintering the laminate upon sandwiching by ceramic or metal setters disposed on both sides of the laminate. The setters disposed on the respective sides can be made to have different porosities respectively. Thus, with respect to the atmosphere surrounding the sintered object, a setter with gas permeability and a dense setter without gas permeability can be used to differ the manner of exposure of the sintered object (sintered body) to the atmosphere gas. Sintering accompanying an oxidation reaction can thus be performed at one side while performing sintering not accompanying an oxidation reaction at the other side, and the positive electrode and the negative electrode can be sintered simultaneously in the furnace of the same atmosphere. Shortening of the manufacturing process and improvement of productivity can thus be achieved.

What is claimed is:

1. A method for manufacturing a lithium ion secondary battery comprising the step of:
    sintering a laminate sandwiched by a first setter disposed on a positive electrode side, hereinafter referred to as a positive electrode setter, and a second setter disposed on a negative electrode side, hereinafter referred to as a negative electrode setter, of the laminate having only an interface between an electrolyte green sheet and a positive electrode green sheet and an interface between the electrolyte green sheet and a negative electrode green sheet
    wherein the positive electrode setter and the negative electrode setter have different porosities such that the positive electrode setter has a porosity of at least 20%, and the negative electrode setter has a porosity of not exceeding 5%.

2. The method according to claim 1 wherein at least one of the positive electrode setter and the negative electrode setter has an average pore diameter of 0 to 100 μm.

3. The method according to claim 1 wherein at least one of the positive electrode setter and the negative electrode setter has a maximum pore diameter of 0 to 200 μm.

4. The method according to claim 1 wherein the positive electrode setter has a porosity of 20 to 75%.

5. The method according to claim 1 wherein the positive electrode setter and the negative electrode setter have different average pore diameters.

6. The method according to claim 5 wherein the positive electrode setter has an average pore diameter of at least 0.5 μm.

7. The method according to claim 6 wherein the negative electrode setter has a maximum pore diameter of not exceeding 0.5 μm.

8. The method according to claim 5 wherein and the negative electrode setter has an average pore diameter of at least 0.5 μm.

9. The method according to claim 8 wherein the positive electrode setter has a maximum pore diameter of not exceeding 0.5 μm.

10. The method according to claim 1 wherein each of the positive electrode setter and the negative electrode setter comprises ceramic, glass, crystallized glass, metal, or a composite material thereof.

11. A method for manufacturing a lithium ion secondary battery comprising the step of:
    sintering a laminate sandwiched by a setter disposed on a positive electrode side, hereinafter referred to as a positive electrode setter, and a setter disposed on a negative electrode side, hereinafter referred to as a negative electrode setter, of the laminate, which comprises a positive electrode green sheet and a negative electrode green sheet and has only an interface between an electrolyte green sheet and the positive electrode green sheet and an interface between the electrolyte green sheet and the negative electrode green sheet,
    wherein the porosity of the positive electrode setter is greater than that of the negative electrode setter, and a sintering atmosphere has an oxygen concentration of not exceeding 10% in the sintering process.

12. A method for manufacturing a lithium ion secondary battery comprising the step of:
    sintering a laminate sandwiched by a setter disposed on a positive electrode side, hereinafter referred to as a positive electrode setter, and a setter disposed on a negative electrode side, hereinafter referred to as a negative electrode setter, of the laminate, which comprises:
    a positive electrode green sheet and a negative electrode green sheet and has only an interface between an electrolyte green sheet and the positive electrode green sheet and an interface between the electrolyte green sheet and the negative electrode green sheet,
    wherein the porosity of the negative electrode setter is greater than that of the positive electrode setter, and a sintering atmosphere has an oxygen concentration of not exceeding 20% in the sintering process.

* * * * *